US008416766B2

(12) United States Patent
Raza

(10) Patent No.: US 8,416,766 B2
(45) Date of Patent: Apr. 9, 2013

(54) METHOD FOR IMPLEMENTING DISTRIBUTED VOICE FUNCTIONS INTO SOFTWARE APPLICATIONS

(75) Inventor: Sarwar S. Raza, Brookline, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

(21) Appl. No.: 12/476,482

(22) Filed: Jun. 2, 2009

(65) Prior Publication Data

US 2009/0323675 A1    Dec. 31, 2009

Related U.S. Application Data

(60) Provisional application No. 61/076,299, filed on Jun. 27, 2008.

(51) Int. Cl.
*H04L 12/66* (2006.01)
(52) U.S. Cl.
USPC ........................................................ 370/352
(58) Field of Classification Search ........................ None
See application file for complete search history.

(56) References Cited

U.S. PATENT DOCUMENTS

| | | | | |
|---|---|---|---|---|
| 6,330,321 | B2* | 12/2001 | Detampel et al. | 379/205.01 |
| 2002/0150227 | A1* | 10/2002 | Abraham | 379/218.02 |
| 2005/0213724 | A1* | 9/2005 | O'Brien et al. | 379/202.01 |
| 2006/0190580 | A1* | 8/2006 | Shu et al. | 709/223 |
| 2006/0256816 | A1* | 11/2006 | Yarlagadda et al. | 370/466 |
| 2007/0183405 | A1* | 8/2007 | Bennett | 370/352 |
| 2008/0249782 | A1* | 10/2008 | Ativanichayaphong et al. | 704/275 |

FOREIGN PATENT DOCUMENTS

CN    101103612 A    1/2008

OTHER PUBLICATIONS

Chinese Office Action, Chinese Patent Application No. 200910146274.0, Nov. 20, 2012, pp. 1-5.

* cited by examiner

*Primary Examiner* — Chirag Shah
*Assistant Examiner* — Minh-Trang Nguyen

(57) ABSTRACT

A system includes application software that issues voice function requests to one or more web services server. A web services server receives the requests from the application software. In response to the voice function request, the web services server selects at least one to perform one or more actions to provide the voice function request and issues implementation specific messages to the selected device or devices to perform the actions.

10 Claims, 9 Drawing Sheets

Figure 5a

Sample Call Control Request:
Scenario: makeCall, extension 5551212 calling extension 111

```xml
<?xml version='1.0' encoding='utf-8'?>
<soapenv:Envelope xmlns:soapenv="http://schemas.xmlsoap.org/soap/envelope/">
<soapenv:Header>
<wsse:Security xmlns:wsse="http://docs.oasis-open.org/wss/2004/01/oasis-200401-wss-wssecurity-secext-1.0.xsd" soapenv:mustUnderstand="1">
<wsse:UsernameToken xmlns:wsu="http://docs.oasis-open.org/wss/2004/01/oasis-200401-wss-wssecurity-utility-1.0.xsd" wsu:Id="UsernameToken-1172603793487">
<wsse:Username>webconf</wsse:Username>
<wsse:Password Type="http://docs.oasis-open.org/wss/2004/01/oasis-200401-wss-username-token-profile-1.0#PasswordText">wcpwd</wsse:Password>
</wsse:UsernameToken>
</wsse:Security>
</soapenv:Header>
<soapenv:Body>
<ns1:callControlRequest xmlns:ns1="http://ws.coms.com/iptelephony/">
<ns1:actionType>makeCall</ns1:actionType>
<ns1:credentials>
<ns1:originNumber>2125551212</ns1:originNumber>
<ns1:password />
</ns1:credentials>
<ns1:destinationNumber>7815551313</ns1:destinationNumber>
<ns1:serviceValidator APIVersion="V1">Version</ns1:serviceValidator>
</ns1:callControlRequest>
</soapenv:Body>
</soapenv:Envelope>
```

Sample Response:
```
<?xml version='1.0' encoding='utf-8'?>
<soapenv:Envelope xmlns:soapenv="http://schemas.xmlsoap.org/soap/envelope/">
<soapenv:Header />
<soapenv:Body>
<ns5:callControlResponse xmlns:ns5="http://ws.coms.com/iptelephony/">Success</ns5:callControlResponse>
</soapenv:Body>
</soapenv:Envelope>
```

SAMPLE PHONE CONFIG REQUEST:
Scenario: Setting do not disturb on extension 110

```xml
<?xml version='1.0' encoding='utf-8'?>
<soapenv:Envelope xmlns:soapenv="http://schemas.xmlsoap.org/soap/envelope/">
<soapenv:Header>
<wsse:Security xmlns:wsse="http://docs.oasis-open.org/wss/2004/01/oasis-200401-wss-wssecurity-secext-1.0.xsd" soapenv:mustUnderstand="1">
<wsse:UsernameToken xmlns:wsu="http://docs.oasis-open.org/wss/2004/01/oasis-200401-wss-wssecurity-utility-1.0.xsd" wsu:Id="UsernameToken-1172695231034">
<wsse:Username>jshmoe</wsse:Username>
<wsse:Password Type="http://docs.oasis-open.org/wss/2004/01/oasis-200401-wss-username-token-profile-1.0#PasswordText">1234</wsse:Password>
</wsse:UsernameToken>
</wsse:Security>
</soapenv:Header>
<soapenv:Body>
<ns1:phoneConfigRequest xmlns:ns1="http://ws.coms.com/iptelephony/">
<ns1:actionType>dndSet</ns1:actionType>
<ns1:credentials>
<ns1:originNumber>110</ns1:originNumber>
<ns1:password />
</ns1:credentials>
<ns1:destinationNumber>111</ns1:destinationNumber>
<ns1:serviceValidator APIVersion="V1">Version</ns1:serviceValidator>
</ns1:phoneConfigRequest>
</soapenv:Body>
</soapenv:Envelope>
```

Figure 7

SAMPLE PHONE STATUS REQUEST:

Scenario: Extension 5551212 has just dialed extension 111, and the remote extension is ringing (call not yet established)

```xml
<?xml version='1.0' encoding='utf-8'?>
<soapenv:Envelope xmlns:soapenv="http://schemas.xmlsoap.org/soap/envelope/">
<soapenv:Header>
<wsse:Security xmlns:wsse="http://docs.oasis-open.org/wss/2004/01/oasis-200401-wss-wssecurity-secext-1.0.xsd" soapenv:mustUnderstand="1">
<wsse:UsernameToken xmlns:wsu="http://docs.oasis-open.org/wss/2004/01/oasis-200401-wss-wssecurity-utility-1.0.xsd" wsu:Id="UsernameToken-1172603798565">
<wsse:Username>webconf</wsse:Username>
<wsse:Password Type="http://docs.oasis-open.org/wss/2004/01/oasis-200401-wss-username-token-profile-1.0#PasswordText">wcpwd</wsse:Password>
</wsse:UsernameToken>
</wsse:Security>
</soapenv:Header>
<soapenv:Body>
<ns1:phoneStatusRequest xmlns:ns1="http://ws.coms.com/iptelephony/">
<ns1:actionType>getPhoneState</ns1:actionType>
<ns1:credentials>
<ns1:originNumber>5551212</ns1:originNumber>
<ns1:password />
</ns1:credentials>
<ns1:destinationNumber>111</ns1:destinationNumber>
<ns1:serviceValidator APIVersion="V1">Version</ns1:serviceValidator>
</ns1:phoneStatusRequest>
</soapenv:Body>
</soapenv:Envelope>
```

METHOD FOR IMPLEMENTING DISTRIBUTED VOICE FUNCTIONS INTO SOFTWARE APPLICATIONS

CROSS REFERENCE TO RELATED APPLICATION

This application claims benefit of U.S. Prov. Pat. App. Ser. No. 61/076,299, filed on Jun. 27, 2008, entitled "Method For Implementing Distributed Voice Functions Into Software Applications" hereby incorporated by reference.

FIELD

In general, the present invention is directed to distributing the execution of voice functions which are integrated into Software applications, and particularly, assigning and coordinating voice functions across a distributed VoIP implementation.

BACKGROUND

The use of voice features embedded in Software applications by enterprises to interact with their customers and Software partners has become popular. Applications that range from push to talk web page features from customer support to automated appointment reminders are leveraging VoIP technologies. The programmer writing such Software applications are specialized in their type of application software, but are usually not experts in telephony protocols.

In common VoIP deployments, multiple sites of an enterprise are located at different locations. Sites range in size from a small network where there are only a few employees and minimal VoIP device capabilities to a large corporate network such as corporate headquarters with many employees and with very capable and possibly redundant VoIP devices to execute application function requests.

Therefore, there is a need for a system and method to translate high level voice function requests, e.g., from software applications, to lower level actions necessary to accomplish the high level request. It is further desirable to hide the details of where lower level actions are executed and provide greater availability of the service by choosing from a set possible resources to accomplish the requested function.

SUMMARY

In response to the aforementioned need, the present invention provides voice functions to application writers while hiding implementation details. The details of implementation specific protocols and the decision of which components implement the requested voice function are hidden from the application writer.

A VCX SDK provides a software interface that accepts high level voice function requests and coordinates the lower level actions necessary to accomplish the high level request. The present invention not only translates high level voice function requests to lower level actions necessary to accomplish the high level request, but also hides details of where lower level actions are executed. This simplifies the job of the Software application programmer by removing an implementation complication and provides a more robust implementation that conforms to present configuration without the application writer to have anticipated the configuration variations.

The invention provides a method and system to implement voice functions within a software application. Included are software that operates with the software application, the software for receiving a request to perform a voice function and in response to the request, issues a request to a web services server. The web services server determines what device or devices will perform one or more actions to provide the requested voice function.

The requested voice function may be to establish a voice call between two or more specified parties, to configure phone settings, to read phone status, and other voice functions. The web service server communicates with one or more other web service servers to determine which device or devices will perform one or more actions to provide the requested voice function. The device or devices includes one or more of call processors, conference bridges, media gateways, phone sets, soft phones, and voice mail servers, at least. The software can use HTTPS protocol to issue requests to web service server.

In another embodiment, the invention provides a software development kit including a programming interface that provides voice functions, logic that receives a voice function request and logic that, in response to the request, determines which web services server or web service servers to issue a request.

The voice function request establishes a voice call between two or more specified parties. The software of the software development kit can use HTTPS protocol to issue requests to web service server.

In yet another embodiment, the invention provides a voice services server including logic to receive voice function requests, and logic that, in response to the voice function request, determines what device or devices will perform one or more actions to provide the voice function request. The voice services server communicates with one or more other web service servers to determine which device or devices will perform the actions to provide the voice function request.

In still another embodiment, the invention provides system comprising including application software that issues voice function requests to one or more web services server, a web services server which receives the requests from the application software. The web services server, in response to the voice function request, determines what device or devices will perform one or more actions to provide the voice function request. The web services server issues implementation specific messages to the selected device or devices to perform one or more actions.

The system can also include a device that receives implementation specific messages and performs the request action The web services server communicates with one or more other web service servers to determine which device or devices will perform the actions to provide the voice function request.

BRIEF DESCRIPTION OF THE DRAWINGS

FIG. 5a is an illustration of a sample call control request according to the invention;

FIG. 5b is an illustration of a sample response to the call control request shown in FIG. 5a;

FIG. 6 is an illustration of a sample phone configuration request according to the invention;

FIG. 7 is an illustration of a sample phone status request according to the invention.

DETAILED DESCRIPTION

Figure 1:
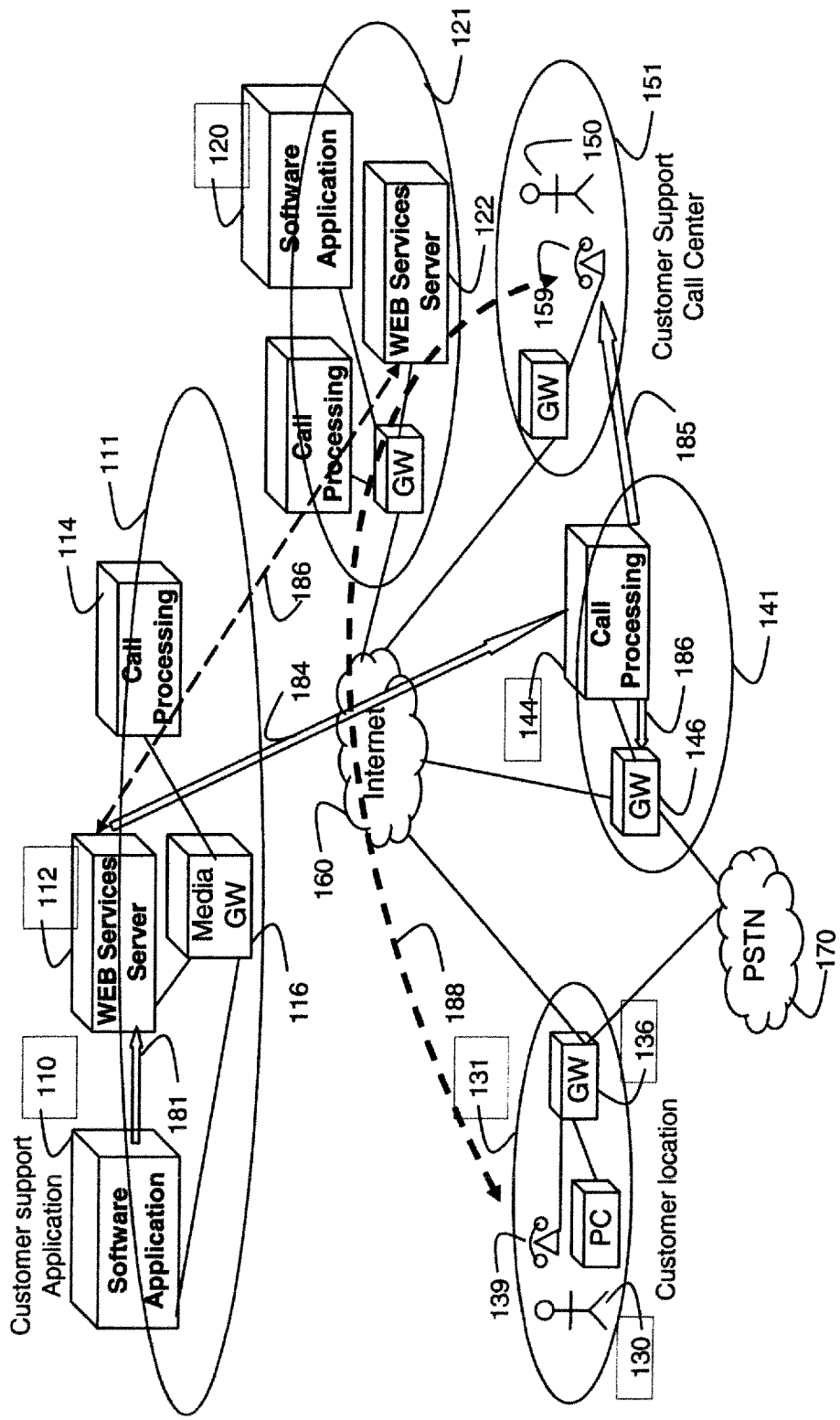
FIG. 1 is a block diagram of a software application, interacting with a customer, utilizing voice function requests to the voice web server, in a distributed voice technology implementation.

Referring to FIG. 1, a software application 110 at one location 111 issues a voice function request 181 to a WEB Service Server 112. The WEB Service Server 112 selects at least one component to execute the requested voice function and instructs the selected component to perform one or more voice function actions 184. The WEB Service Server 112 may communicate with other WEB services servers 122 at the same site or other sites in order to select the at least one component to execute the voice function request, this communication is shown as 186 which includes a request 186a and response 186b. The WEB Service Server 112 may use information about the operation state, device capability, geographically locale and work load assignments to determine which component or components should perform the voice function request. Once the component or components are selected, implementation specific protocols are used to instruct the selected components to perform a function. Next, a specific example is given using SIP as the implementation specific protocol to instruct the voice components to carry out the voice function requested by the software application.

In this example, a customer 130, located at home location 131, visits company xyz's web site to check on the status of an online order. The order status indicates it was delivered but the customer 130 has not received the item and decides to contact customer service. On xyz's customer service web page there is a link labeled "phone contact." Once clicked, a window pops up asking for the customer's phone number. The customer enters its home phone number. The Software application retrieves the customer's phone number and requests a voice function to be performed by the Web Services Server 112. The voice function request 181 is to establish a call between the customer's phone 139 and any available customer service personnel that can check on delivery status. This request 181 originates from software application 110 having Web Services Server 112 as a destination.

The Web Services Server 112 receives the request to establish a call between the customer's phone 139 and the customer care for deliveries. The Web Services Server 112 extracts parameters for the voice function request. The Web Services Server 112 communicates 186 with the Web Services Server 122 at location 121 to determine the phone number to be used to contact the customer care for deliveries, at this point in time. The Web Services Server 122 employs device specific commands to register for status events and monitors device availability and load to update dynamic device information. The Web Services Server 122 may also access other static policy data about the devices that may describe device address, capabilities, and task assignment parameters and preferences.

To control a phone (also referred to as "associated phone"), the Web Services Server performs the following actions:

1. Collect the following information from the user:
Primary and secondary VCX system IP
Phone number and MAC address of associated phone
2. Register with the call processor 3. Subscribe to the call processor to retrieve all the contacts (reg event) registered with the associated phone number. Process the Notify messages generated by the call processor 4. Subscribe to all the contacts received to obtain each contact MAC address (mac-address-query-event event)

5. Subscribe to the associated phone to get detailed line status information (line-status-event event)

6. Process the line status information received from the phone and send commands to the phone to make calls, answer calls, etc.

To monitor other phones, the Web Services Server performs the following actions:

1. Retrieve a local and global directory via sftp link to retrieve a list of users on the system 2. For each monitored user, subscribe to the call processor to retrieve all the contacts (reg event) to show if a user is logged in or not 3. To show detailed information about a monitored user (list of all calls, party the user is currently talking to, to pick up calls or barge into calls on a monitored user's phone . . . ), subscribe to the call processor to get dialog information (dig event)

4. For each monitored user, subscribe to each phone contact (line-status-event event) to display the 'do not disturb' status (enabled/disabled), 'call forward universal' status (enabled/disabled), etc.

The Web Services Server renews the registration and all the subscriptions sent to the call processor and to the phones before they expire (e.g every hour). On shutdown, the Web Services Server terminates the registration and all the subscriptions that were sent to the call processor and to the phones.

The Web Services Server is configured as a trusted endpoint on the VCX system. The Web Services Server can then register with the call processor without being challenged. For example, the Web Services Server sends the following message to register:

```
REGISTER sip:152.67.120.165 SIP/2.0
  Via:SIP/2.0/UDP192.168.3.12:5060;branch=c55c4e41f5d25edada84dd-
5deb70875e
From:<sip:remCont1@152.67.120.165>;tag=d40ee69daeaaaff9e7072e-
db2e9d30e8
  To: <sip:remCont1@152.67.120.165>
  Call-ID: 36486e115c7813f17d28566516a7af7c@192.168.3.260
  CSeq: 1 REGISTER
  Contact: sip:192.168.3.12:5060
  Expires: 3600
  Content-Length: 0
```

To retrieve the list of contacts for a specific phone number and to be notified when a user logs in and out, the Web Services Server sends a subscribe for reg event to the call processor. For example, to get the list of contacts for user 1000, the Web Services Server sends the following subscribe message:

```
SUBSCRIBE sip:1000@152.67.120.165 SIP/2.0
  Via:                                                    SIP/2.0/UDP
192.168.3.12:5060;branch=0c9b81e530b620090166a0dbc33913be
  From:
<sip:remCont1@152.67.120.165>;tag=cc307b72b8e8d672cef2100755-
214718
  To: <sip:1000@152.67.120.165>
  Call-ID: e3f07a4cbbb34c1d83fa12757467343b@192.168.3.12
  CSeq: 1 SUBSCRIBE
  Contact: sip:192.168.3.12:5060
```

-continued

```
Event: reg
Expires: 3600
Content-Length: 0
```

The subscribe message includes the following:

Subscribe request and to field must be set to the user for which this subscription applies The Event field is present and set to 'reg'

When the call processor receives the subscribe message, if one or multiple contacts are registered for that user, the call processor will send a Notify message with the list of registered contacts. For example:

```
NOTIFY sip:192.168.3.12 SIP/2.0
Via: SIP/2.0/UDP 152.67.120.165;branch=2435161525
CSeq: 1 NOTIFY
From: <sip:152.67.120.165>;tag=3fa662921acc
To: <sip:remCont1@152.67.120.165>;tag=11223344-1111-2222-33
Contact: <sip:3ComCallProcessor@152.67.120.165>
Call-ID: 690361689@152.104.62.67
Event: reg
Subscription-State: active;expires=3600
Content-Type: application/reginfo+xml
Content-Length:317
    <xml version="1.0"><reginfo xmlns=
"urn:ietf:params:xml:ns:reginfo" version="0" state="partial">
    <registration aor=1000@152.67.120.165 id="1000@152.67.120.
165" state="active">
    <contact       id="151.104.62.89"         state="active"
event="registered">1000@151.104.62.89</contact>
    <contact       id="151.104.61.17"         state="active"
event="registered">1000@151.104.61.17</contact>
    </registration></reginfo>
```

If the call processor has an active subscription for a user and a new contact registers for that user, the call processor sends a Notify message with all active contacts. If the call processor has an active subscription for a user and if the registration times out or the user logs out, the call processor sends a Notify message (with event-"expired") containing all the active contacts as well as the contact that unregistered or expired.

For example:

```
NOTIFY sip: remCont1@152.67.120.165 SIP/2.0
Via: SIP/2.0/UDP 152.67.120.165;branch=2435161525
CSeq: 1 NOTIFY
From: <sip:152.67.120.165>;tag=3fa662921acc
To: <sip:remCont1@152.67.120.165>;tag=11223344-1111-2222-33
Contact: <sip:3ComCallProcessor@152.67.120.165>
Call-ID: 690361689@152.104.62.67
Event: reg
Subscription-State: active;expires=3600
Content-Type: application/reginfo+xml
Content-Length:317
    <xml version="1.0"><reginfo xmlns=
"urn:ietf:params:xml:ns:reginfo" version="1" state="partial">
    <registration aor=1000@152.67.120.165 id="1000@152.67.120.
165" state="active">
    <contact       id="151.104.62.89"         state="active"
event="registered">1000@151.104.62.89</contact>
    <contact       id="151.104.61.17"         state="terminated"
event="expired">1000@151.104.61.17</contact>
    </registration></reginfo>
```

The Web Services Server subscribes for mac-address-query-event to all the active contacts received by the call processor for the associated phone number. This is preferable for two reasons:

Since a phone can be registered at multiple places, the Web Services Server retrieves the MAC address of all the registered contacts in order to determine which physical phone is the one the user wants to control.

When a phone has an active subscription for mac-address-query-event, it adds detailed line information to the line-status-event notify messages.

For example:

```
SUBSCRIBE sip:1000@192.168.3.252 SIP/2.0
Via: SIP/2.0/UDP
192.168.3.12:5060;branch=f7edc8ca1f63360a66362feb2da02004
From:
<sip:remCont1@152.67.120.165>;tag=f9ea40b0d39d527c900305fe965-
dbf08
To: <sip:1000@152.67.120.165>
Call-ID: 2e0496df0b31a9f2a3ef9f71d05b0ab5@195.14.163.185
CSeq: 1 SUBSCRIBE
Contact: sip:192.168.3.12:5060
Event: mac-address-query-event
Expires: 3600
Accept: application/mac-address
Content-Length: 0
```

The phone sends back OK and then generates the following Notify message (containing the contact MAC address):

For example:

```
NOTIFY sip:1000@192.168.3.12 SIP/2.0
Via: SIP/2.0/UDP
192.168.3.252:5060;branch=f7edc8ca1f63360a66362feb2da02004
To:
<sip:remCont1@152.67.120.165>;tag=f9ea40b0d39d527c900305fe965-
dbf08
From: <sip:1000@152.67.120.165>
Call-ID: 2e0496df0b31a9f2a3ef9f71d05b0ab5@195.14.163.185
CSeq: 1
NOTIFY
Contact: sip:1000@192.168.3.12:5060
Event: mac-address-query-event
Subscription-State: active
Accept: application/mac-address
Content-Length: 21
MAC=00:12:33:44:22:12
To subscribe for line status information, the Web Services Server sends
a subscribe for line-status-event to the phone.
For example:
SUBSCRIBE sip:1000@192.168.3.252 SIP/2.0
Via: SIP/2.0/UDP
192.168.3.260:5060;branch=c8c8267effe04fc43c20a52c366ac5af
From:
<sip:remCont1@152.67.120.165>;tag=7b8f07377f9399d6f3a019b2eb-
2193f9
To: <sip:1000@152.67.120.165>
Call-ID: f962e9b5d80cf785bd176a60f024811c@192.168.3.260 CSeq: 9
SUBSCRIBE
Contact: sip:192.168.3.260:5060
Event: line-status-event
Expires: 3600
Accept: application/line-status
Content-Length: 0
The phone sends back OK.
```

If the phone doesn't have an active subscription for mac-address-query-event from the Web Services Server, the phone generates notify messages containing only general status for the phone (idle, busy, dnd status, message waiting, call forward universal status, emergency call in progress)

For example:

```
NOTIFY sip:remCont1@192.168.3.260 SIP/2.0
Via: SIP/2.0/UDP 192.168.3.260:5060
To:
<sip:remCont1@152.67.120.165>;tag=95fd6effa9596d0cbd3727edb6008-
edf
    From: <sip:1000@152.67.120.165>
    Call-ID: f962e9b5d80cf785bd176a60f024811c@192.168.3.252
    CSeq: 20 NOTIFY
    Contact: <sip:1000@192.168.3.252:5060>
    User-Agent: "3Com-SIP-Phone/V7.1.40.40"
    Event: line-status-event
    Subscription-State: active
    Content-Type: application/line-status
    Content-Length: 52
    PHONE=1000@152.67.120.165\n
    LINE_STATUS=1
    The Web Services Server needs to send back OK.
```

The LINE_STATUS field indicates the status of the phone. It can be a combination of multiple values (for example, if do not disturb is enabled and the user is on a call, the value for LINE_STATUS is 3).

```
LINE_IDLE = 0          // Idle
LINE_OFF_HOOK = 1,     // Off hook (or line in use)
LINE_DND = 2,          // DND enabled
LINE_MWI = 4,          // Message waiting
LINE_CFWD = 8,         // Call forward universal enabled
LINE_EMER = 16         // Emergency call in progress
```

If the phone has an active subscription for mac-address-query-event from the Web Services Server the phone generates notify messages containing the general status of the phone as well as detailed line status information in xml format.

The XML for line notification is based off rfc 4235 with the following exceptions:
    Added line=<line#> in the dialog info
    Added remote=<phone# of remote> in dialog id
    Proceeding state is not reported.
    Additional information for transfer/conference/park is specific to 3com
    For example:

```
NOTIFY sip:remCont1@192.168.3.252 SIP/2.0
v: SIP/2.0/UDP 192.168.3.260:5060
t:
<sip:remCont1@152.67.120.165>;tag=95fd6effa9596d0cbd3727ed-
b6008edf
    f: <sip:1000@152.67.120.165>
    i: f962e9b5d80cf785bd176a60f024811c@192.168.3.260
    CSeq: 20 NOTIFY
    m: <sip:1000@192.168.3.160:5060>
    User-Agent: "3Com-SIP-Phone/V7.1.40.40"
    Event: line-status-event
    Subscription-State: active
    c: application/line-status
    l: 1040
    PHONE=1000@152.67.120.165
    LINE_STATUS=1
    <?xml version="1.0"?>
    <sip-line-state>
    <dialog-info xmlns="urn:ietf:params:xml:ns:dialog-info"
        version="0" state="full"
        entity="1000@152.67.120.165" line="1">
        <dialog id=ea939898-01d6-0192-16ed-
```

```
00e0bb139b5a@192.168.3.160
    call-id=ea939898-01d6-0192-16ed-00e0bb139b5a@192.168.3.160
    local-tag="ea939898-01d6-0192-16ec-00e0bb139b5a"
    remote-tag="87cc78c"
    direction="initiator" remote="1001" remote_name="user1001">
    <state>confirmed</state>
    <substate>hold</substate>
</dialog>
</dialog-info>
<dialog-info xmlns="urn:ietf:params:xml:ns:dialog-info"
    version="0" state="full"
    entity="1000@152.67.120.165" line="2">
    <dialog id=eec92bf8-01d6-0192-16ef-
00e0bb139b5a@192.168.3.160
    call-id=eec92bf8-01d6-0192-16ef-00e0bb139b5a@192.168.3.160
    local-tag="eec92bf8-01d6-0192-16ee-00e0bb139b5a"
    remote-tag="aa0acca4"
    direction="initiator" remote="1002" remote_name="user1002">
    <state>confirmed</state>
    </dialog>
</dialog-info>
</sip-line-state>
```

The Web Services Server 122 responds with a number for phone 159 at the Customer Support Call Center 151. The Web Services Server 112, upon receipt of the Customer Support Call Center phone number from Web Services Server 122 determines that due to the locations of the customer phone 139 and the customer support phone 159, that the call processor 144 at location 141 will establish the call.

The Web Services Server 112 instructs 184 the call processor (voice device) 144 at location 141 to establish a call between the customer 130 at the customer location 131 with the phone number entered at the customer service WEB page, and the Call Center personnel 150 at the Call Center location 151. The call processor 144 establishes a call between the Call Center Ethernet phone 159 at location 151, over the internet to the gateway (GW) 146 at location 141, and from gateway (GW) 146 phone call will be carried over the PSTN to the customer phone 139 at location 131. The phone call which is a result of these instructions is illustrated as dotted line 188. The call is established using SIP messages to the Call Center phone 159 with messages 185 and other SIP messages to the gateway (GW) 146 with messages 186. The gateway is also instructed to relay the VoIP packets over the PSTN to the customer.

In one embodiment, the Web Services Server 112 instructs the Call Processor 144 to generate a SIP INVITE message to the gateway 146 to establish a call to the customer phone 139 over the PSTN 170, and once it is picked up by the customer 130, then the Call Processor 144 would generate a second INVITE on the customer phone's behalf to the Call Center Ethernet phone 159 at location 151. In another embodiment the Web Services Server 112 issues a series of commands to the Call Center Ethernet phone 159 at location 151 to emulate the actions of a user dialing the customer phone number. The Call Center Ethernet phone 159 at location 151 may authenticate that the Web Services Server 112 is authorized to have user emulation privileges on the Call Center Ethernet phone. The dialed number is then routed by the call processor 144 to the user phone via gateway 146 and the PSTN 170.

Figure 2:
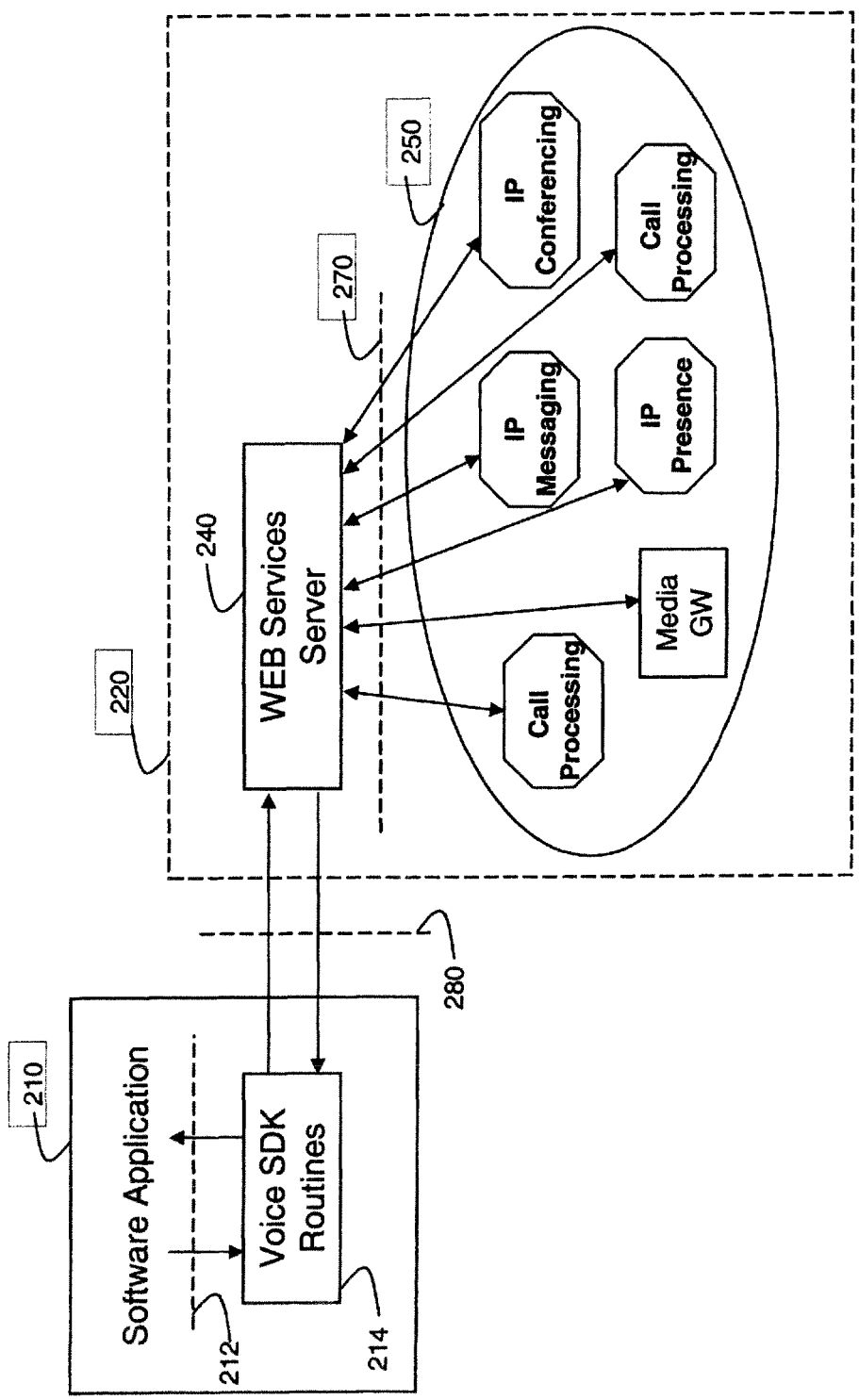
FIG. 2 is a block diagram of an SDK software interface according to the invention and associated voice technology implementation devices.

Referring to FIG. 2, a software application 210 with an installed voice services Software Developers Kit (SDK) 214 is shown. The SDK is software provided to the software application developer and is linked in or otherwise associated with the application code created, by the application developer, to incorporate voice services in an application. The SDK provides an application program interface (API) 212 to the software application. This voice service API is published as a Web Service, in the form of a 'WSDL' document. This document serves as the programmatic interface via which an application writer can integrate their applications with voice system components, e.g. a VCX™ system by 3Com Corporation. The API is platform neutral, e.g. XML based, and is programming language agnostic, which allows for integration across legacy and newer applications. The application writer decides how to make best use of the APIs provided to embed voice services into a software environment.

This program interface 212 provides function calls to perform voice function requests. The SDK receives these voice function requests and either pass them via interface 280 using protocols such as SOAP, XML, and HTTPS/SSL to a Web Services Server 240 or provides the Web Services Server function and issues voice protocol specific commands to voice system components 250, to provide the requested voice service. The voice specific commands, for example using the SIP protocol, are issued via the interface 270 from the Web Services Server 240 and the voice system components 250.

Figure 3:
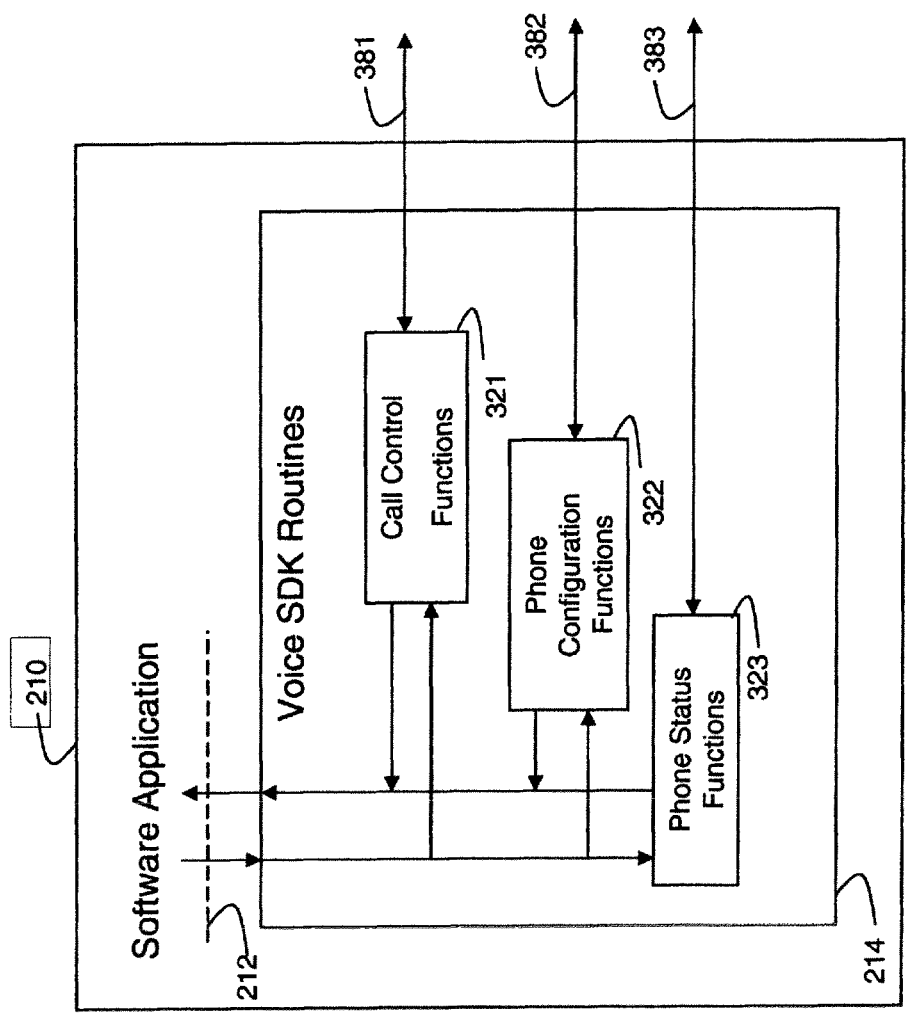
FIG. 3 is a block diagram of Call Control, Phone Configuration, and Phone Status, according to the invention.

Referring to FIG. 3, the SDK 214 contains Call Control functions 321, Phone Configuration functions 322, and Phone Status functions 323. The parameters used by the Call Control function 321 are the SecurityData and CallControlActionType. The SecurityData section of the XML payload contains identity and authentication tokens. A software application utilizing the API has to present its credentials to the Call control device (as part of the defined SecurityData structure) before a web service request will be performed. Some examples of voice Call Control Actions are; Make a Call; Put a Call on Hold; Disconnect a Call; Transfer a Call; and Add party to a Conference Call. The Call Control action Make a Call method enables a call attempt from an 'origin' phone to a destination 'phone'. The origin phone (the invoker) is a handset, e.g., connected to a VCX™ system by 3Com Corporation. The destination phone can be any telephony (IP/PSTN) endpoint (an example is given in FIG. 5a and the response in FIG. 5b). The Call Control action Disconnect a Call will disconnect an in progress call at the 'origin' extension. The Call Control action Put a Call on Hold method will place an in progress call on hold at the 'origin' extension. The Call Control action Conference Call adds another party to an in-progress call using the VCX conferencing feature. The Call Control action Transfer Call allows an established call to be transferred from one phone to another.

The parameters used by the Phone Configuration function are SecurityData and PhoneConfigActionType. The SecurityData section of the XML payload contains identity and authentication tokens. A software application utilizing the API presents its credentials to the Call control device (as part of the defined SecurityData structure) before a web service request will be honored. Some examples of Phone Configuration Actions are; Set Do Not Disturb and Unset Do Not Disturb which toggles this feature (example shown in FIG. 6), which indicates if incoming calls are to ring on the phone. If Do Not Disturb (DND) is set then the phone will not ring, but may provide a visual alert and call information so the call can be answered if desired by a user. Another example is Set Forward to V-Mail and Unset Forward to V-Mail which toggles the setting to send an in coming call to voice mail. Call Forward Busy, Call Forward Ring No Answer, Call Forward Universal control the call forward features, Call Forward Busy changes the destination number where calls will be forwarded when a line is busy, Call Forward Ring No Answer Changes the destination number where calls will be forwarded when a line is not answered in a specified number of rings, and Call Forward Universal Forwards all incoming calls to another number. This feature overrides Call Forward Busy and Call Forward Ring No Answer. Huntgroup login and Huntgroup logout control membership of the phone in a Huntgroup. Hunt Groups are provided to help manage inbound calls. Hunt Groups direct calls to specific users that are identified as members of the Hunt Groups. The Mute phone function toggles the mute setting on the 'origin' phone.

The parameters used by the Phone Status function are SecurityData and PhoneStatusActionType. The SecurityData section of the XML payload contains identity and authentication tokens. A software application utilizing the API presents its credentials to the Call control device (as part of the defined SecurityData structure) before a web service request will be performed. The Phone Status Actions specifies a state being read. Examples of these actions are described below (example shown in FIG. 7). Get Phone State allows for a programmatic lookup of the current call state for an extension. If multiple calls are in progress, they are all reported. The Following call states are reported Call originated, Call Delivered, Call Established, Call held, and Connection Cleared. Get Do Not Disturb (DND) State allows for a programmatic lookup of DND state of a user's phone. Get Forward Mail to V-Mail State provides a programmatic lookup of the Forward Mail State of a user's phone. Get Call Forward Universal (CFU) State provides a programmatic lookup of the CFU State of a user's phone. Get Call Forward Busy (CFB) State provides a programmatic lookup of the CFB State of a user's phone. Get Call Forward Ring No Answer (CFRNA) State provides a programmatic lookup of the CRFNA State of a user's phone.

The SDK, as provided to the application writer, contains sample applications that are fully functional applications that interact with the voice components such as call processor and desktop phone sets. These examples provide example usage and patterns for use by developers unfamiliar with the voice system components. The sample applications include; source code, formatted and commented to allow for easy learning of the VCX API on the part of developers; build files and project files which enable a developer to build, compile and run the sample applications using provided instructions; and a walk-through, in text file format, of the code structure, and the running application, including instructions on what other voice system components (phones, servers etc.) can be employed to make full use of the sample applications.

Figure 4:
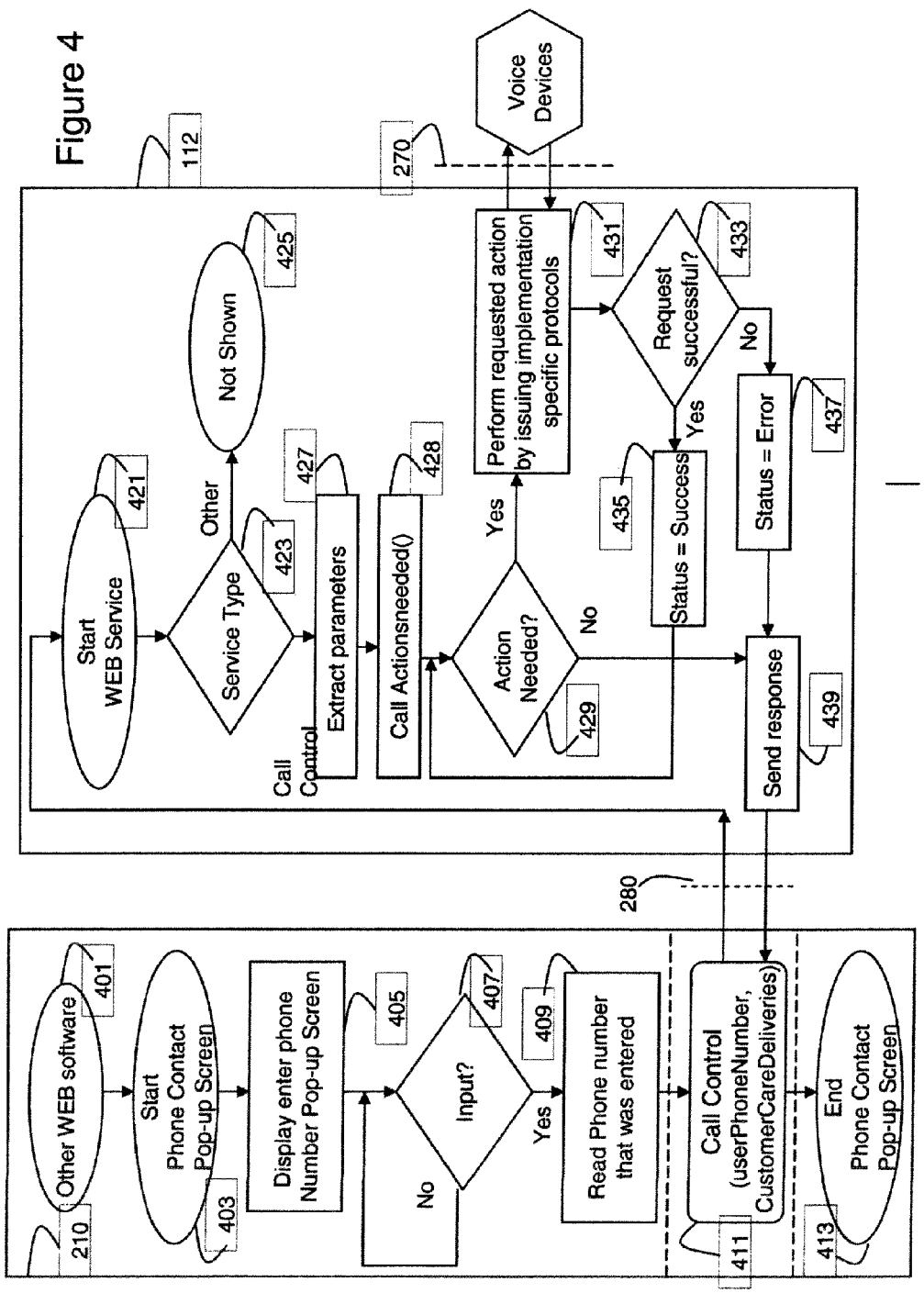
FIG. 4 is a flow diagram for an aspect of a software application, voice SDK, and the Web Service Server software according to the invention.

Referring to FIG. 4, a flow chart shows an aspect of the Software Application 210, and the Web services server 112 as described in FIG. 1. Other web application software 401 represents software in the Software Application 210 that operates on xyz's customer service web page, but is not necessary for understanding the invention. As described above with respect to FIG. 1, on xyz's customer service web page there is a link labeled "phone contact", once clicked a window pops up asking for the customer's phone number. Referring back to FIG. 4, the customer then enters its home phone number. At step 403 the phone contact pop-up screen routine is called, which displays the pop-up window and at step 405 and waits for input from the user at step 407. Once the user enters its phone number, the software proceeds to step 409 where the phone number is read from the user's input.

Figure 8:
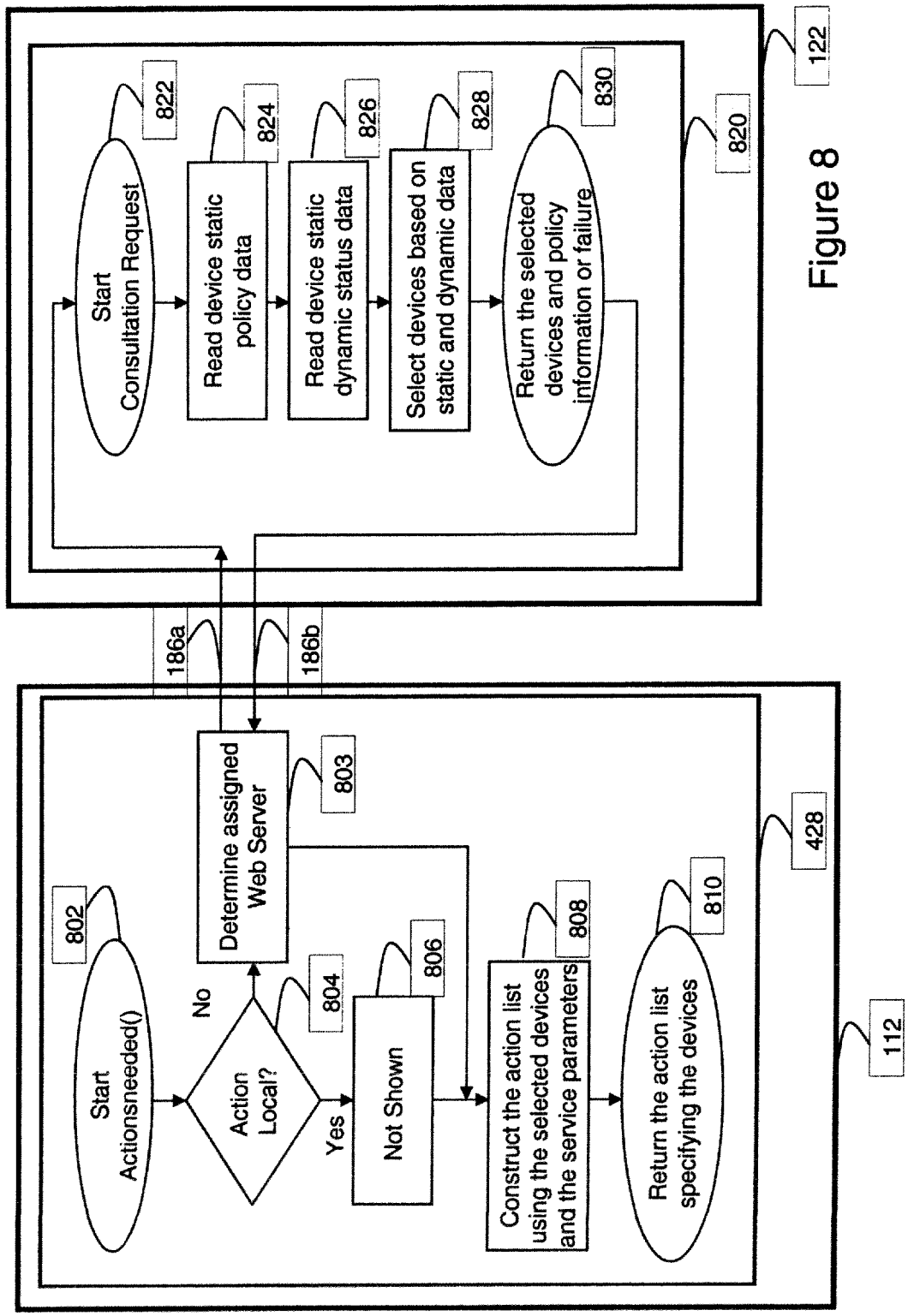
FIG. 8 is a flow diagram of interaction between an application and a web services server according to the invention.

At step 411 the Software Application calls the SDK Call Control function to place a call between the user's phone and the customer care for deliveries hunt group number (example given in FIG. 5a). The SDK issues a request to the Web Services Server 112 via interface 280. The Web Services Software 112 starts at step 421. The Web Services Server determines what type of service is being requested at step 423. If the service type is not Call Control, then other software not shown is used 425. If the service type is Call Control, then the parameters are extracted at step 427. The Actionsneeded( ) routine is called to determine a set of actions to carry out the request and the device to carry out the actions are selected. More details about the Actionsneeded( ) routine are shown in FIG. 8. In this case the each of the actions is implemented by sending implementation specific protocol messages to the voice devices at step 431. The implementation specific messages are issue via interface 270.

In one embodiment, the Web Services Server 112 instructs the Call Processor 144 to generate a SIP INVITE message to the gateway 146 to establish a call to the customer phone 139 over the PSTN 170. Once the call is picked up by the customer 130, then the Call Processor 144 generates a second INVITE to the Call Center Ethernet phone 159 at location 151. Alternatively the Actionsneeded( ) routine 428 could have selected an action list that issues a series of commands to the Call Center Ethernet phone 159 at location 151 to emulate the actions of a user dialing the custom phone number. This decision could be based on configured policy data or a device attribute offering a proprietary solution. The Call Center Ethernet phone 159 at location 151 may authenticate that the Web Services Server 112 is authorized to have access this proprietary user emulation privileges on the Call Center Ethernet phone. After the Web Services Server 112 has remotely dialed using the key by key commend method, the dialed number is then routed by the call processor 144 to the customer's phone via gateway 146 and the PSTN 170.

The success of the attempted action is checked at step 433. If the action was successful, then the status would be set to success at step 435 and go back to step 429 to see if more actions were needed and once all the actions are complete the successful status is returned at step 439 (an example message is shown in FIG. 5*b*). If the action was not successful, then status would be set to error at step 437 and a response would sent 439, indicating the failure and that the requested action was not completed.

Referring to FIG. 8, the routine Actionsneeded( ) 428 starts at step 802 and examines the parameters passed in to determine if the devices needed are under the local control of this Web Server 112 or they are under control of another web server. This decision is made at step 804. If the devices are not under local control then the web server that does have control is determined at step 803. The Web Server 112 communicates with Web Server 122, which does have control over the call center devices and can determine which phone in the hunt group for deliveries should be used to handle the call. Software 820 running on Web Server 122 receives the communication request 186*a* at step 822.

Static policy data about the devices or device groups that could be utilized to fulfill the actions are retrieved and read at step 824. Up to date status information about the devices or device groups are retrieved and read at step 826. Based on the read policy data and the status data, the devices to carry out the actions are selected at step 828. At step 830 the selected devices and relevant policy data is passed back in a response 186*b*. The Web Server 112 receives the response 186*b* and proceeds to construct the actions list at step 808. The selected device list, the policy information, and other information passed in parameters (e.g., telephone numbers) are used to construct a list of device specific actions using specified protocols. This list is returned at step 810 ending step 428 of FIG. 4, where the action requests are issued to the selected devices using the specified protocols.

While only a few illustrative embodiments of the present invention have been discussed, it is understood that various modification will be apparent to those skilled in the art in view of the description herein. All such modifications are within the spirit and scope of the invention as encompassed by the following claims.

I claim:

1. A web services server comprising:
a memory having a set of machine readable instructions stored therein which, if executed, causes a processor to:
receive a voice function request from a first apparatus;
determine information about an operation state, device capability, geographic locale, and work load assignments of a plurality of devices;
use the determined information of the plurality of devices to select one of the plurality of devices to perform the requested voice function;
issue implementation specific messages to the selected device to perform the requested voice function;
retrieve a local and global directory of users on a Voice over Internet Protocol (VOIP) system;
for each of a plurality of monitored users, subscribe to a call processor to show if each of the plurality of monitored users is logged in or not;
subscribe to the call processor to show detailed information about a monitored user of the plurality of monitored users; and
for each of the plurality of monitored users, subscribe to each phone contact to display a status of each of the plurality of monitored users.

2. The web services server of claim 1, wherein the voice function request includes a request to establish a voice call between two or more specified parties, to configure phone settings, or to read a phone status.

3. The web services server of claim 1, wherein the plurality of devices include at least one of call processors, conference bridges, media gateways, phone sets, soft phones, and voice mail servers.

4. The web services server of claim 1, wherein the web services server is a trusted endpoint on a Voice over Internet Protocol (VoIP) system.

5. The web services server of claim 1, wherein the set of machine readable instructions further comprise code to:
collect primary and secondary Voice over Internet Protocol (VoIP) system IP from the first apparatus;
collect an associated phone number and a media access controller (MAC) address of an associated phone from the first apparatus;
register with a call processor;
subscribe to the call processor to retrieve all contacts registered with the associated phone number;
process notify messages generated by the call processor;
subscribe to all contacts received to obtain each contact MAC address;
subscribe to the associated phone to get detailed line status information; and
process the line status information received from the phone and send commands to the phone.

6. A method for implementing voice functions comprising:
receiving, at a web services server, a voice function request;
selecting, by the web services server, a device to perform the requested voice function wherein the device is selected from a plurality of devices based upon information about an operation state, device capability, geographic locale, and work load assignments of the plurality of devices;
issuing, by the web services server, implementation specific messages to the selected device to perform the requested voice function;

retrieving, by the web services server, a local and global directory via a link to retrieve a list of users on a Voice over Internet Protocol (VoIP) system;

for each of a plurality of monitored users, subscribing, by the web services server, to a call processor to retrieve all contacts to show if each of the plurality of monitored users is logged in or not;

subscribing, by the web services server, to the call processor to get dialog information to show detailed information about a monitored user of the plurality of monitored users; and for each of the plurality of monitored users, displaying, by the web services server, a status of each of the plurality of monitored users.

7. The method of claim 6, wherein the voice function request includes a request to establish a voice call between two or more specified parties, to configure phone settings, or to read a phone status.

8. The method of claim 6, wherein the plurality of devices includes at least one of call processors, conference bridges, media gateways, phone sets, soft phones, and voice mail servers.

9. The method of claim 6, wherein the web services server is a trusted endpoint on a Voice over Internet Protocol (VoIP) system.

10. The method of claim 6, further comprising:

collecting primary and secondary Voice over Internet Protocol (VoIP) system IP a first apparatus from which the voice function request was received;

collecting an associated phone number and a media access controller (MAC) address of an associated phone from the first apparatus;

registering with a call processor;

subscribing to the call processor to retrieve all contacts registered with the associated phone number;

processing notify messages generated by the call processor;

subscribing to all contacts received to obtain each contact MAC address;

subscribing to the associated phone to get detailed line status information; and processing the line status information received from the phone and sending commands to the phone.

* * * * *